United States Patent
Raynes et al.

[11] 4,119,367
[45] Oct. 10, 1978

[54] LIQUID CRYSTAL DISPLAYS

[76] Inventors: Edward Peter Raynes, 2, Weyburn Close, Lower Wick, Worcester, County of Hereford and Worcester; Ian Alexander Shanks, 68, Lower Wyche Rd., Malvern, County of Hereford, and Worcester, both of England; John Charles Varney, 24, Wellpark Ter., Neilston, Glasgow, Scotland

[21] Appl. No.: 663,360

[22] Filed: Mar. 3, 1976

[30] Foreign Application Priority Data

Mar. 6, 1975 [GB] United Kingdom ................. 9441/75

[51] Int. Cl.² ............................................. G02F 1/13
[52] U.S. Cl. .................................. 350/333; 340/324 M
[58] Field of Search ................. 350/160 LC; 340/336, 340/324 M

[56] References Cited

U.S. PATENT DOCUMENTS

| | | | |
|---|---|---|---|
| 3,955,187 | 5/1976 | Bigelow | 340/324 M |
| 3,976,362 | 8/1976 | Kawakami et al. | 350/160 LC |
| 3,995,939 | 12/1976 | Borel et al. | 350/160 LC |
| 3,995,942 | 12/1976 | Kawakami et al. | 350/160 LC |

*Primary Examiner*—John K. Corbin
*Assistant Examiner*—Rolf Hille
*Attorney, Agent, or Firm*—Stevens, Davis, Miller & Mosher

[57] ABSTRACT

A liquid crystal display comprises a liquid crystal material layer contained between transparent slides which carry electrodes arranged in lines and columns to form an $x$, $y$ matrix with $x$, $y$ intersections. The liquid crystal layer at the intersections are turned on line by line by a blanking voltage, turned off by application of a zero voltage, and held at a threshold voltage at other times. The voltages are applied from a two phase supply in the form of two sinusoidal waves spaced 60° apart in phase. Threshold voltages at an intersection are maintained by applying one of the two waveforms to $x$ electrodes and a zero voltage to $y$ electrodes. A zero voltage at $x$, $y$ intersections is arranged by applying the other of the two waveforms to both $x$, $y$ electrodes.

6 Claims, 4 Drawing Figures

LIQUID CRYSTAL DISPLAYS

This invention relates to liquid crystal displays in which selected parts of a display are addressed in matrix form.

Liquid crystal displays are commonly formed by enclosing a thin layer e.g. 12 μm thick, between glass slides provided on their inner faces with transparent electrodes. Application of a voltage to the electrodes causes a change in optical properties in the liquid crystal between the electrodes, removal of the voltage allows the liquid crystal to relax back to its original state. Thus for example a part of a display can be made to appear transparent in a coloured back ground, or vice versa, and this is usefully used in digital watch displays. For simple displays such as small numeric watch displays only a relatively few electrodes are required. However for a large display it becomes impractical to provide an individual pair of electrodes to each part of the display requiring addressing.

One solution to the addressing of large displays commonly used in electro-optic displays is to address in a matrix, i.e. use a series of long column electrodes on one of the glass slides and a series of long line electrodes on the other glass slide. Thus by applying a voltage to a particular column and a line electrode liquid crystal between the intersection of those two electrodes is addressed. A similar technique may also be used to multiplex the addressing of seven segment type digital displays.

Unfortunately the time required for a liquid crystal to change its optical property on application of an electrical voltage i.e. its 'on' state, and the time required to relax back to its original 'off' state after removal of the voltage is frequently incompatible with matrix addressing or multiplexing. This is because the whole display cannot be addressed before parts of the display decay back to their non-addressed state.

According to this invention a method of addressing a matrix liquid crystal display comprises the steps of applying a voltage across a plurality of active areas of liquid crystal to change them to their on state, applying a zero voltage between selected electrodes in sequence for sufficient time to cause a change in optical property in the liquid crystal at the intersection of those selected electrodes, and at other times applying a voltage to the electrodes to maintain a voltage across the liquid crystal layer at a sustaining value close to the threshold level, wherein the voltages are obtained by selective application of zero volts, and two sinusoidal waveforms 60° out of phase.

Apparatus for carrying out the method of this invention includes a liquid crystal cell comprising a layer of liquid crystal material sandwiched between two slides at least one of which is transparent, each slide having on its inner surface spaced electrodes arranged to form a plurality of intersections across the liquid crystal layer, and further includes circuitry for applying a voltage to the electrodes to change the liquid crystal to its on state, circuitry for applying a voltage to the electrodes to maintain a sustaining voltage close to a threshold voltage across the liquid crystal layer, and circuitry for applying across selected intersections in sequence a zero voltage, the voltage being obtained by selective application of zero voltage, a first sinusoidal voltage waveform, and a second sinusoidal voltage waveform similar to the first voltage waveform but 60° different in phase to obtain the required voltage across the intersections.

The two 60° phased waveforms should be as near a sine waveform as possible since if the waveform becomes too distorted e.g. a square wave the device does not work. The liquid crystal responds to the r.m.s. value of the wave provided that its frequency has a period appreciably shorter than the response times of the liquid crystal.

To obtain a threshold voltage across an intersection a zero voltage is applied to one electrode and either the first or second voltage waveform applied to the other electrode at the intersection. To obtain a zero voltage between two electrodes at an intersection either the first or second voltage waveform is applied to both electrodes. The term active areas of liquid crystal is defined as the areas at the intersection's between opposing electrodes.

The liquid crystal may be a positive nematic with between 1% and 99% of a cholesteric material.

Such a material mixture, when formed as a thin layer in a liquid crystal cell, scatters light in its off state with no electric field applied across the layer. Application of a blanking voltage, typically 30 volts r.m.s. for a 12 μm thick layer containing about 10% of cholesteric by weight, causes a realignment of liquid crystal molecules parallel to the applied field i.e. its on state. In this on state the layer is transparent. The time taken to turn from off to on depends on the amount of cholesteric material present, the layer thickness, and the applied voltage level. At a critical voltage, the threshold value, the molecules will start to change from their off state to their on state. If the voltage is suddenly removed from across the layer, the liquid crystal molecules return to their off state in typically 60 μsec for a layer thickness 12 μm containing 33% of cholesteric. However if a voltage having an r.m.s. value near this critical value is applied across the layer after the cell has been turned on it maintains its on state for up to about 40 seconds or longer. The liquid crystal mixture may contain a suitable quantity, say 0.25% to 10% w/w of a dichroic or pleochroic dye or a mixture of such dyes. In this case the liquid crystal is opaque or coloured in its off state and becomes clear and colourless or changes colour when turned fully on.

The invention will now be described by way of examply only in the accompanying drawings in which.

Figure 1:
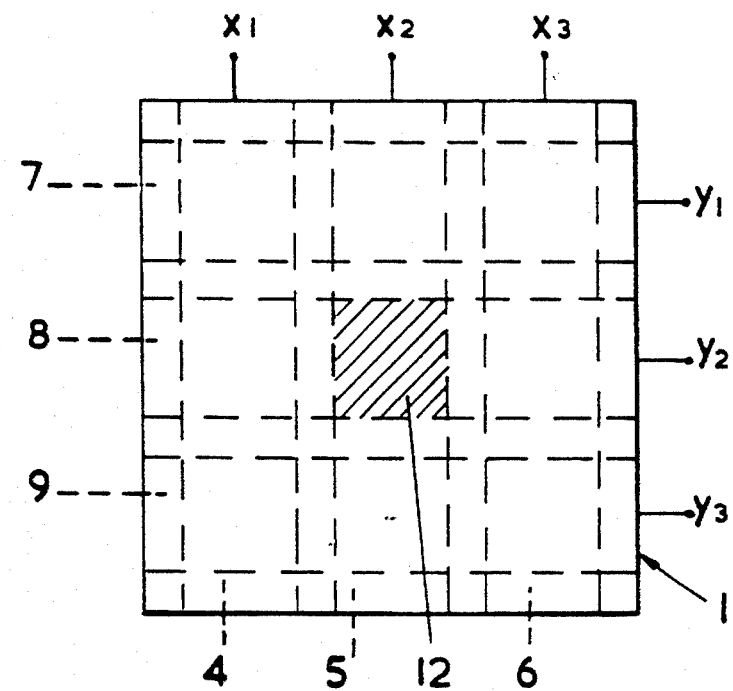
FIG. 1 is a front view of a three by three matrix display.
Figure 2:
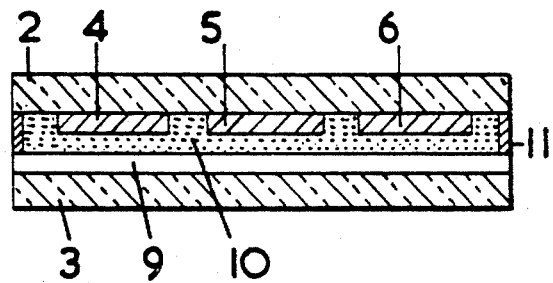
FIG. 2 is a sectional plan view of FIG. 1.

As seen in FIGS. 1, 2 a cell 1 comprises two glass slides 2, 3. The slide 2 carries three transparent ribbon shaped electrodes 4, 5, 6 forming column or $x$ electrodes whilst the slide 3 carries similar electrodes 7, 8, 9 forming line or $y$ electrodes. Typically the electrodes are 500Å thick tin oxide deposited as a continuous layer and etched to the desired shape. Between the slides 2, 3 is a 6 μ to 40 μm thin layer 10 of liquid crystal material such as n-pentyl-cyanobiphenyl nematic material containing a cholesteric material such as cholesteryl nonanoate. An epoxy resin adhesive 11 is used to seal the edges of the cell 1. Electrical connections are made to each electrode.

A.C. voltages are applied to the cell 1 from a two phase (60° apart) sinusoidal supply (not shown). If V is the r.m.s. magnitude of the supply voltage, the supply from each phase may be indicated by $V\angle 0$, $V\angle 60$. It may be shown that $$[V\angle 60 - V\angle 0]_{RMS} = [V\angle 0]_{RMS} = [V\angle 60]_{RMS}$$

In operation a blanking voltage of sufficiently high value is applied between each $x$ and $y$ electrode to cause an alignment of liquid crystal molecules parallel to the applied field. The blanking voltage may be obtained by applying $+ V\angle 60$ to the $x$ electrodes and $- V\angle 60$ to the $y$ electrodes to give $2V$ across an intersection. At each intersection of $x$, $y$ electrodes (an active area) the liquid crystal material 10 is transparent and light will pass through the cell 1. After the blanking voltage has been applied, a threshold voltage is applied as follows. A voltage $V\angle 60$ is applied to each $x$ electrode and a zero voltage is applied to each $y$ electrode. At each electrode intersection the voltage is therefore $V\angle 60$ and $V_{RMS}$ is arranged to approximately equal the threshold voltage $V_{th}$. Each intersection continues to appear transparent for up to about 40 seconds or longer. Assume now it is required to make the intersection at $x_2$, $y_2$ appear opaque i.e. the liquid crystal scatter light, this is shown at 12 in FIG. 1. A voltage $V\angle 0$ is applied to both electrodes $x_2$, $y_2$ resulting in zero voltage across the liquid crystal 10 at their intersection. All other intersections continue to have V applied. For example at intersection $x_2$, $y_1$ the voltage on $x_2$ is $V\angle 0$, and on $y_1$ is zero resulting in $V\angle 0$. At intersection $x_1$, $y_2$ the voltage on $x_1$ is $V\angle 60$, and on $y_2$ is $V\angle 0$ resulting in $V\angle 60 - V\angle 0$ whose R.M.S. value is V, i.e. the threshold voltage. Once the intersection at $x_2$, $y_2$ becomes opaque return of V has insufficient effect to make the intersection appear transparent. Thus V is re-applied to $x_2 y_2$ and another intersection may be addressed with zero voltage. The whole of the cell 1 is addressed as required then the process is repeated i.e. a blanking voltage is applied to the whole cell, threshold voltage applied to the cell and selected intersections addressed.

For a 12 μm thick layer nematic material with 10% cholesteric blanking voltage is typically 80 volts, threshold voltage i.e. V is about 20 volts. For such conditions the liquid crystal becomes clear in about $10^3$ μs, and becomes scattering in about 100 μs when zero voltage is applied to the electrodes. Thus a matrix of $10^4$ elements could be addressed intersection by intersection or $10^4$ lines could be addressed line by line in 1 second.

When addressing a large display the intersections $x$, $y$ may be addressed in a raster manner first from say top left to bottom right of a display then from bottom right to top left. This assists in presenting a more uniform overall contrast. Alternatively the display may be divided into several blocks or individual lines which are blanked, and addressed in sequence.

The examples given illustrate the addressing of individual elements in the matrix. The addressing scheme may also be used to address the display line at a time using known techniques.

The technique need not be confined to $x - y$ matrices. It may also be used with $r-\theta$ polar plot displays and with seven segments type numeric displays.

Figure 3A:
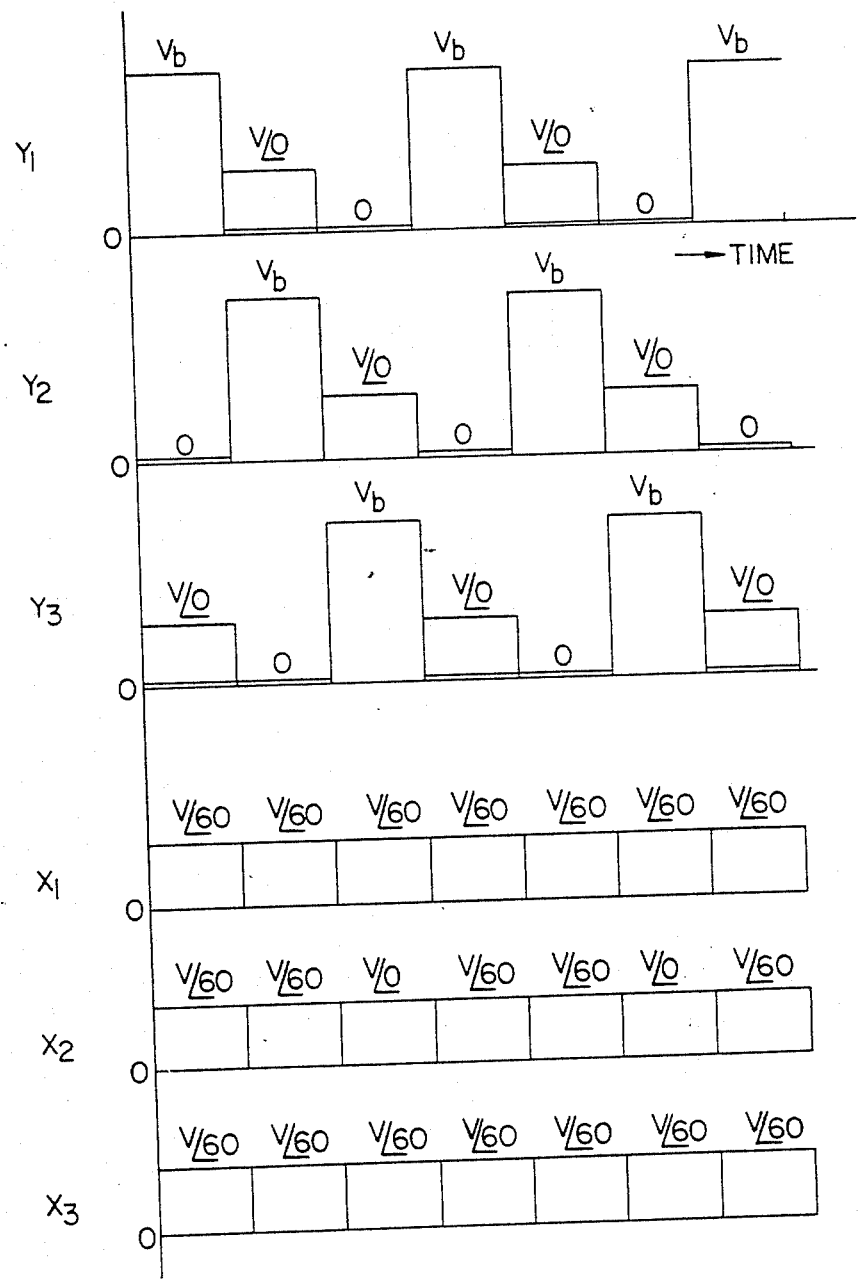
FIG. 3 is a waveform diagram showing how the display of FIG. 1 is addressed line by line.
Figure 3B:
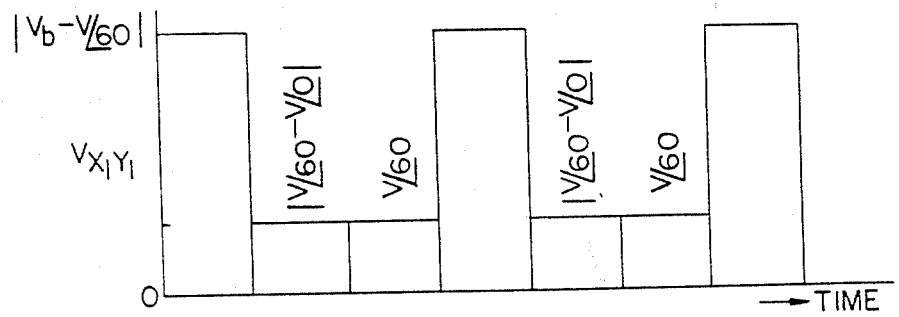
Figure 3B:
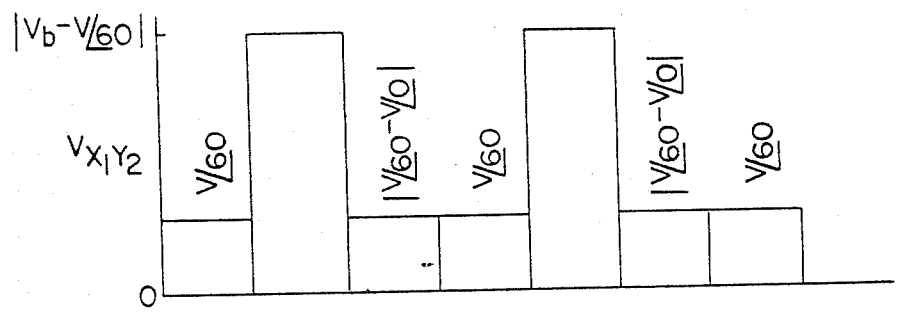
Figure 3B:
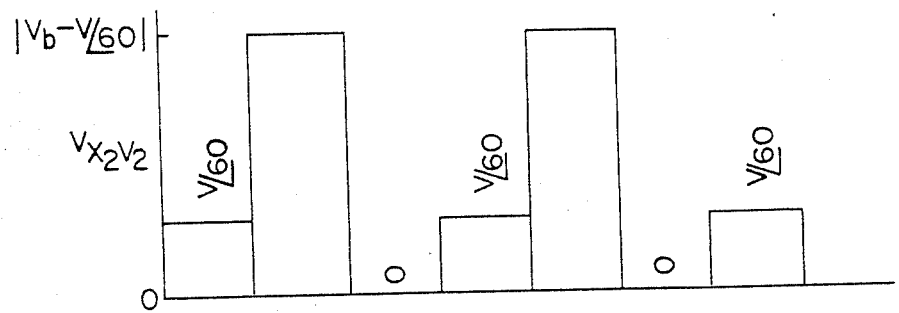
Figure 3B:
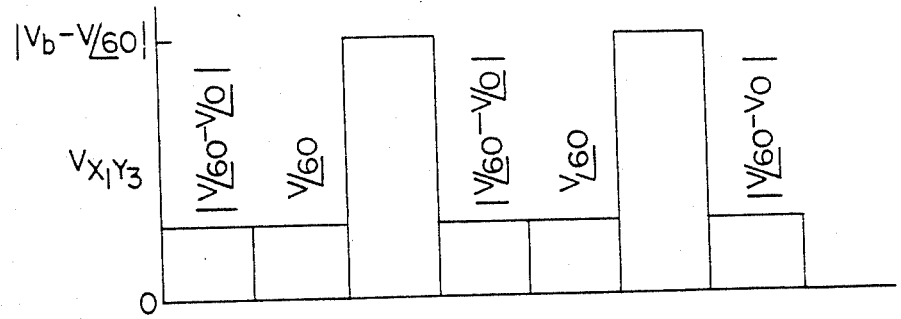

FIGS. 3a and 3b show the envelope of waveforms for applying to the three by three matrix of FIG. 1 when blanked and addressed in a line by line manner.

A blanking voltage $Vb$ followed by $V\angle 0$ is applied to each $y$ electrode in turn. For the remaining time periods each $y$ electrode receives zero voltage. Meanwhile each $x$ electrode receives $V\angle 60$ except for a time period when $V\angle 0$ is applied to the $x_2$ electrode coincident with $V\angle 0$ being applied to $y_2$ so that the $x_2y_2$ intersection is supplied with $V\angle 0 - V\angle 0 = 0$ volts to change its associated liquid crystal state.

I claim:

1. A method of addressing a matrix liquid crystal display which comprises a layer of liquid crystal material contained between a first and a second slide at lease one of which is transparent, said first slide having a first set of transparent strip electrodes, said second slide having a second set of transparent strip electrodes, the two sets of electrodes being arranged to form a matrix of electrode intersections, said method comprising
    applying a blanking voltage across a plurality of active areas of liquid crystal to change them to their on state;
    applying a first of a two phase voltage supply source which supplies two sinusoidal waveforms 60° apart in phase to an electrode in both sets of electrodes at an electrode intersection which is to be turned from an on to an off state;
    applying the second of said sinusoidal waveforms to the remaining first set of electrodes, and applying a zero voltage to the remaining second set of electrodes, whereby the remaining intersections receive a threshold voltage.

2. The method of claim 1 wherein the electrode intersections are arranged in lines and columns and the said application of a voltage across a plurality of active areas of liquid crystal is applied to a line at a time.

3. The method of claim 1 wherein the electrode intersections are arranged in lines and columns and the voltage applied across a plurality of active areas of liquid crystal is applied to the whole display, a below threshold voltage is applied line by line, and a voltage close to the threshold voltage is applied at intersections which do not receive the below threshold voltage.

4. The method of claim 1 wherein the liquid crystal layer is a nematic liquid crystal material containing chloesteric liquid crystal material.

5. The method of claim 4 wherein the liquid crystal layer contains at least one pheochroic dye.

6. A method of addressing a matrix liquid crystal display which comprises a layer of nematic and cholesteric liquid crystal material contained between two slides at least one of which is transparent, said slides having transparent $x$, and $y$ strip electrodes arranged in lines and columns on the slides to form an $x$, $y$ matrix having $x$ times $y$ electrode intersections, said method comprising
    applying a blanking voltage across said layer in a line to turn the layer to an on state,
    applying a first of a two phase voltage supply source which supplies two sinusoidal waveforms 60° apart in phase to both $x$ and $y$ electrodes at an electrode intersection which is to be turned from the on to off state,
    applying the second of said sinusoidal waveforms to the remaining $x$ electrodes, and
    applying a zero voltage to the remaining $y$ electrodes whereby the remaining $x$, $y$ intersections receive a threshold voltage.

* * * * *